(12) United States Patent
Malak et al.

(10) Patent No.: US 11,975,435 B2
(45) Date of Patent: May 7, 2024

(54) LUBRICANT-IMPREGNATED BUSHING FOR IMPACT TOOL

(71) Applicant: MILWAUKEE ELECTRIC TOOL CORPORATION, Brookfield, WI (US)

(72) Inventors: Peter Malak, Waukesha, WI (US); Michael R. Sande, Waukesha, WI (US); Ryan Allen Dedrickson, Sussex, WI (US); Guang Hu, Dongguan (CN); Fan Bin Zeng, Dongguan (CN); Wei Chao Xu, Dongguan (CN); Qiao Cai, Dongguan (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 191 days.

(21) Appl. No.: 17/340,803

(22) Filed: Jun. 7, 2021

(65) Prior Publication Data

US 2021/0291339 A1 Sep. 23, 2021

Related U.S. Application Data

(63) Continuation of application No. 16/457,054, filed on Jun. 28, 2019, now Pat. No. 11,027,404.

(Continued)

(51) Int. Cl.
| | |
|---|---|
| *B25D 17/26* | (2006.01) |
| *B23P 15/00* | (2006.01) |
| *F16C 17/04* | (2006.01) |
| *F16C 33/10* | (2006.01) |
| *B22D 19/00* | (2006.01) |

(Continued)

(52) U.S. Cl.
CPC ............. *B25D 17/26* (2013.01); *B23P 15/00* (2013.01); *F16C 17/04* (2013.01); *F16C 33/1025* (2013.01); *F16C 33/104* (2013.01); *B22D 19/00* (2013.01); *B22F 3/12* (2013.01);

(Continued)

(58) Field of Classification Search
CPC ........ B22D 19/00; B25D 11/04; B25D 16/00; B25D 17/26; B25D 2217/0019; B25D 2217/0096; B22F 3/12; B23P 15/00; F16C 17/04; F16C 33/104; F16C 33/1025
See application file for complete search history.

(56) References Cited

U.S. PATENT DOCUMENTS

| | | | |
|---|---|---|---|
| 2,478,356 A | 8/1949 | Auten | |
| 2,563,711 A * | 8/1951 | Fitch | ..................... B25B 21/026 173/93.6 |

(Continued)

FOREIGN PATENT DOCUMENTS

| | | |
|---|---|---|
| CN | 104148647 A | 11/2014 |
| CN | 208146565 U | 11/2018 |

(Continued)

*Primary Examiner* — Thanh K Truong
*Assistant Examiner* — David G Shutty
(74) *Attorney, Agent, or Firm* — Michael Best & Friedrich LLP

(57) ABSTRACT

A tool includes a housing, a drive assembly including an output shaft extending from the housing such that a tool element for performing work on a workpiece is attachable to the output shaft, and a bushing disposed within the housing. The bushing rotatably supports the output shaft. The bushing is impregnated with lubricant such that the bushing is self-lubricating, and the bushing has an impregnation ratio between about 5% and about 25%.

16 Claims, 4 Drawing Sheets

Related U.S. Application Data

(60) Provisional application No. 62/700,725, filed on Jul. 19, 2018.

(51) Int. Cl.
  *B22F 3/12* (2006.01)
  *B25D 16/00* (2006.01)

(52) U.S. Cl.
  CPC ...... *B25D 16/00* (2013.01); *B25D 2217/0019* (2013.01); *B25D 2217/0096* (2013.01); *F16C 2220/60* (2013.01)

(56) References Cited

U.S. PATENT DOCUMENTS

| | | | |
|---|---|---|---|
| 2,886,997 A * | 5/1959 | Madsen | B25B 21/026 173/93.5 |
| 3,761,257 A | 9/1973 | Dunn | |
| 4,905,423 A * | 3/1990 | van Laere | B25F 5/001 81/464 |
| 5,136,197 A | 8/1992 | Hallett | |
| 6,082,495 A * | 7/2000 | Steinbarger | F04C 29/028 384/102 |
| 6,223,834 B1 | 5/2001 | Takamura et al. | |
| 7,157,824 B2 * | 1/2007 | Joo | H02K 7/063 310/81 |
| 8,815,407 B2 * | 8/2014 | Lee | F16C 33/128 428/592 |
| RE46,827 E | 5/2018 | Rudolph et al. | |
| 10,213,912 B2 * | 2/2019 | Kumagai | B25D 17/26 |
| 11,027,404 B2 * | 6/2021 | Malak | B22F 5/106 |
| 2002/0085775 A1 * | 7/2002 | Mori | F16C 17/026 384/114 |
| 2003/0052468 A1 * | 3/2003 | Harer | B62D 3/12 280/93.514 |
| 2003/0089510 A1 | 5/2003 | Sugimoto et al. | |
| 2005/0133651 A1 | 6/2005 | Cheung | |
| 2005/0183870 A1 | 8/2005 | Wada et al. | |
| 2006/0180327 A1 * | 8/2006 | Nagasaka | B25B 21/02 173/128 |
| 2007/0065064 A1 * | 3/2007 | Kitamura | F16C 19/54 384/537 |
| 2008/0196912 A1 | 8/2008 | Gass et al. | |
| 2011/0068649 A1 * | 3/2011 | Chai | H02K 5/1677 310/90 |
| 2012/0014629 A1 * | 1/2012 | Kim | F16C 33/103 205/640 |
| 2012/0318549 A1 | 12/2012 | Nagasaka et al. | |
| 2013/0039757 A1 | 2/2013 | Chen et al. | |
| 2014/0182869 A1 * | 7/2014 | Kumagai | B25F 5/001 173/93 |
| 2015/0343617 A1 | 12/2015 | Kondo et al. | |
| 2016/0075004 A1 * | 3/2016 | Tsubakimoto | B25B 21/026 173/93 |
| 2016/0079887 A1 | 3/2016 | Takano et al. | |
| 2016/0263731 A1 * | 9/2016 | Matsumoto | B25B 21/02 |
| 2017/0144278 A1 * | 5/2017 | Nishikawa | B25B 21/026 |
| 2017/0146065 A1 * | 5/2017 | Danowski | F16C 17/10 |
| 2018/0087595 A1 * | 3/2018 | Cotter | F16F 9/432 |
| 2019/0118352 A1 * | 4/2019 | Weber | B25F 5/02 |
| 2021/0291339 A1 * | 9/2021 | Malak | B22F 3/26 |

FOREIGN PATENT DOCUMENTS

| | | | | |
|---|---|---|---|---|
| DE | 3522596 A1 | | 1/1987 | |
| EP | 3067156 A1 | | 9/2016 | |
| JP | 2016097487 A | | 5/2016 | |
| JP | 2016153157 A | * | 8/2016 | ............... B25F 5/02 |
| WO | 9920898 A2 | | 4/1999 | |
| WO | 2008057023 A1 | | 5/2008 | |
| WO | 2014024701 A1 | | 2/2014 | |
| WO | 2017057533 A1 | | 4/2017 | |

* cited by examiner

LUBRICANT-IMPREGNATED BUSHING FOR IMPACT TOOL

CROSS-REFERENCE TO RELATED APPLICATIONS

This application is a continuation of co-pending U.S. patent application Ser. No. 16/457,054, filed Jun. 28, 2019, now U.S. Pat. No. 11,027,404, which claims priority to U.S. Provisional Patent Application No. 62/700,725, filed on Jul. 19, 2018, the entire content of each of which is incorporated herein by reference.

FIELD OF THE INVENTION

The present invention relates to power tools, and more specifically to impact tools.

BACKGROUND OF THE INVENTION

Impact tools, such as impact drivers and impact wrenches, are typically utilized to provide a striking rotational force, or intermittent applications of torque, to a tool element or workpiece (e.g., a fastener) to either tighten or loosen the fastener.

SUMMARY OF THE INVENTION

The present invention provides, in one aspect, a power tool including a housing having a motor housing portion and a front casing coupled to the motor housing portion. The power tool also includes an electric motor positioned within the motor housing portion, a drive assembly having an output shaft to which a tool element for performing work on a workpiece is attachable, and a powdered metal bushing disposed within the front casing that rotatably supports the output shaft.

The present invention provides, in another aspect, an impact tool including a housing having a motor housing portion and a front casing coupled to the motor housing portion. The impact tool also includes an electric motor positioned within the motor housing portion and a drive assembly having an anvil, a shaft configured to receive torque from the electric motor, and a hammer. The hammer is configured to impart consecutive rotational impacts upon the anvil. The impact tool further includes a lubricant-impregnated bushing disposed within the front casing that rotatably supports the anvil.

The present invention provides, in yet another aspect, a method of manufacturing a power tool. The method includes forming a bushing from powdered metal by compacting and sintering the powdered metal. The method further includes inserting the bushing into a mold cavity and molding a gear case of the power tool in the mold cavity around the bushing. The method further includes immersing the gear case in lubricant so that the lubricant is wicked into the bushing to impregnate the bushing with the lubricant.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
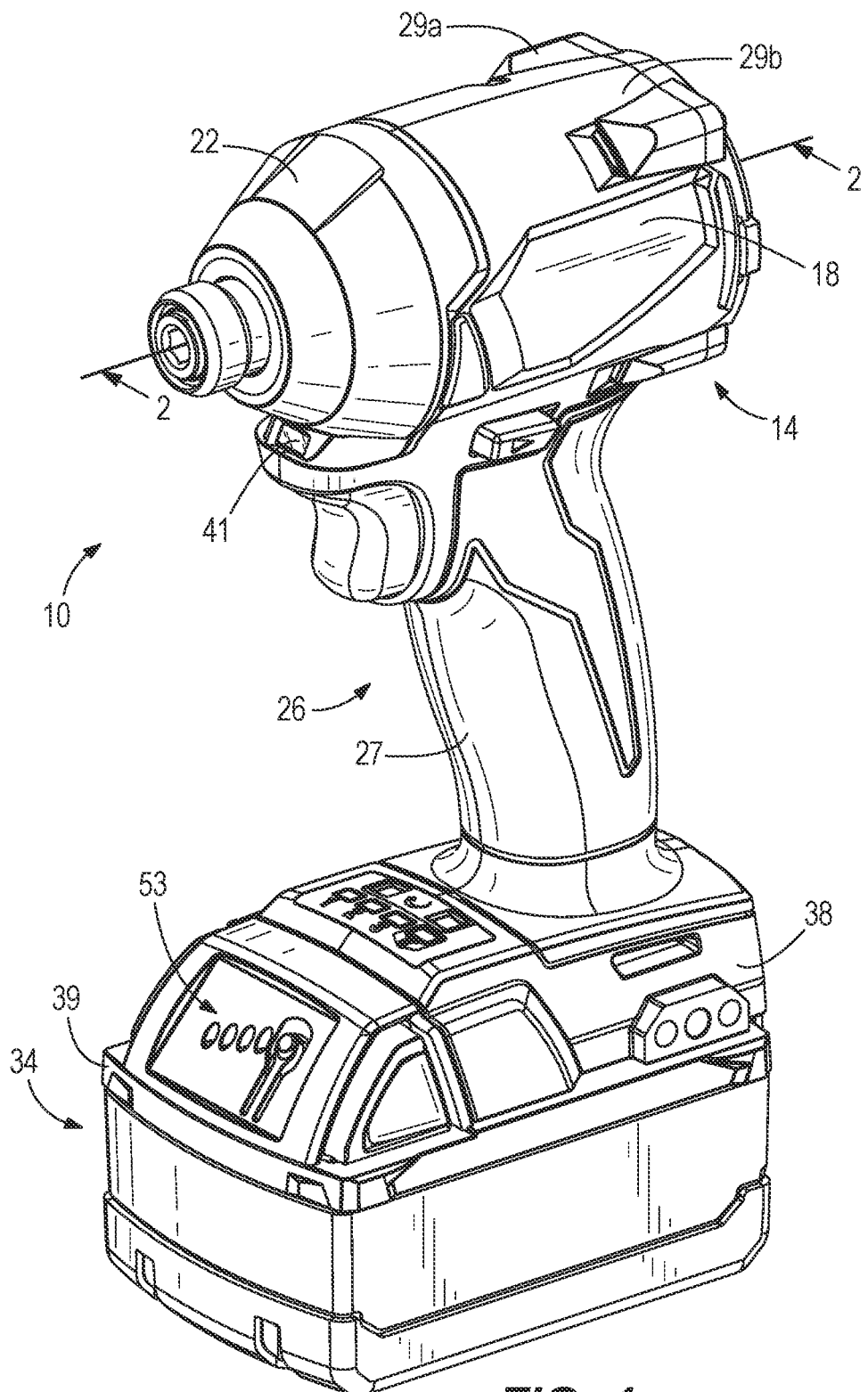
FIG. 1 is a perspective view of an impact tool according to one embodiment.

FIG. 1 illustrates a power tool in the form of a rotary impact tool 10. The impact tool 10 includes a housing 14 with a motor housing portion 18, a front housing portion or gear case 22 coupled to the motor housing portion 18 (e.g., by a plurality of fasteners), and a handle portion 26 disposed underneath the motor housing portion 18. The handle portion 26 includes a grip 27 that can be grasped by a user operating the impact tool 10. In the illustrated embodiment, the handle portion 26 and the motor housing portion 18 are defined by cooperating clamshell halves 29a, 29b.

With continued reference to FIG. 1, the impact tool 10 has a battery pack 34 removably coupled to a battery receptacle 38 located at a bottom end of the handle portion 26. The battery pack 34 includes a housing 39 supporting battery cells 40 (FIG. 2), which are electrically connected to provide the desired output (e.g., nominal voltage, current capacity, etc.) of the battery pack 34. A battery power display 53 indicates the power level remaining in the battery pack 34 (FIG. 1). In other embodiments, the impact tool 10 may include a power cord for electrically connecting the impact tool 10 to a source of AC power. As a further alternative, the impact tool 10 may be configured to operate using a different power source (e.g., a pneumatic power source, etc.).

In the illustrated embodiment, the impact tool 10 includes a light 41 (e.g., an LED light) located at the top end of the handle portion 26 and just below the gear case 22. The light 41 is oriented so as to illuminate a workpiece during operation of the impact tool 10. The light 41 preferably draws power from the battery pack 34 and may automatically illuminate during operation of the impact wrench 10 and shut off after a predetermined time period following operation of the impact tool 10.

Figure 2:
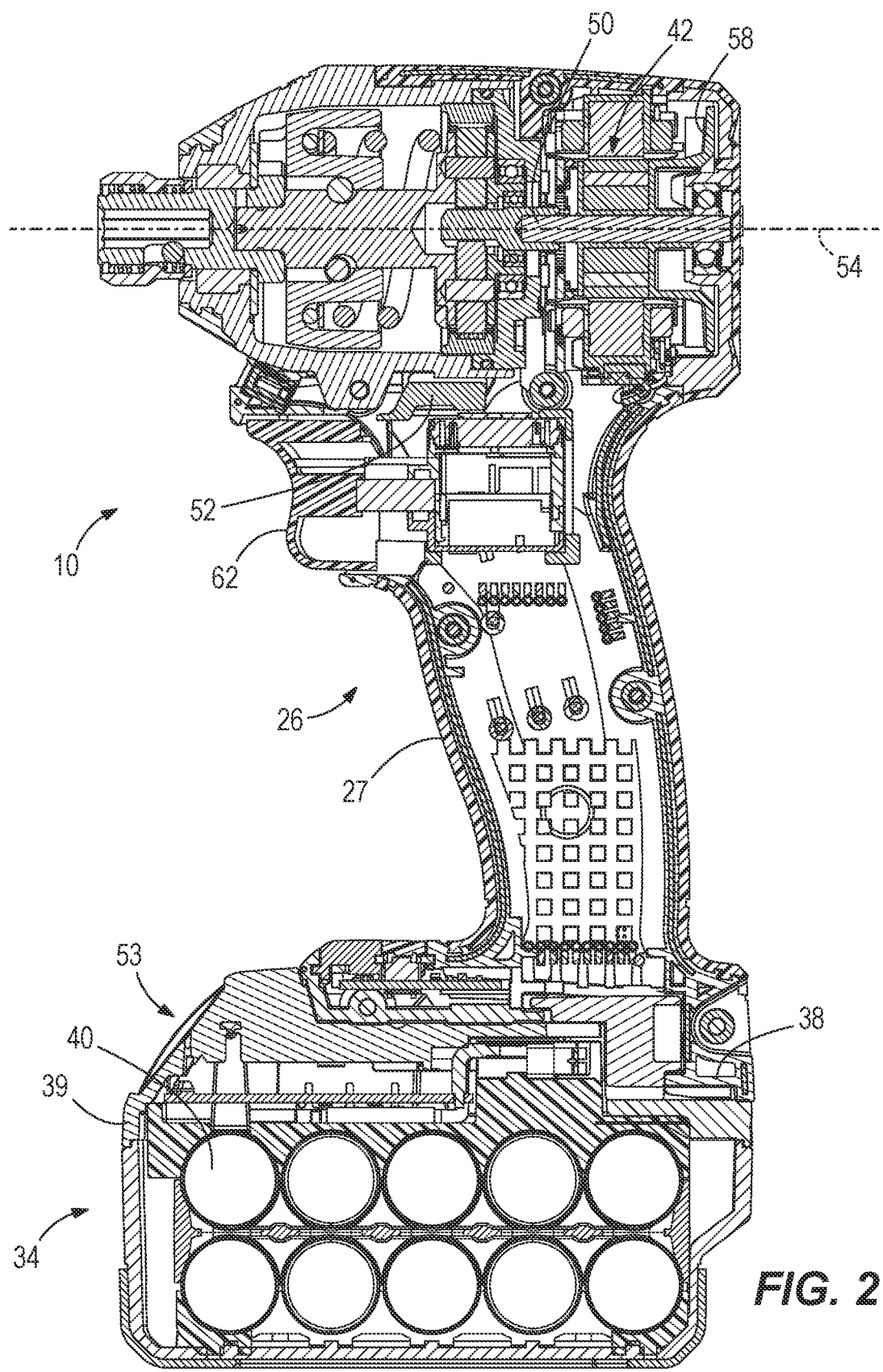
FIG. 2 is a cross-sectional view of the impact tool of FIG. 1, taken along line 2-2 in FIG. 1.

Referring to FIG. 2, an electric motor 42, supported within the motor housing portion 18, receives power from the battery pack 34 when the battery pack 34 is coupled to the battery receptacle 38. The motor 42 is preferably a brushless direct current ("BLDC") motor having a rotor or output shaft 50. A button 52, extending laterally from the housing 14, allows an operator to change the direction that the motor 42 rotates the output shaft 50. The output shaft 50 is rotatable about an axis 54. A fan 58 is coupled to the output shaft 50 (e.g., via a splined connection) behind the motor 42. The impact tool 10 also includes a trigger 62 coupled to the handle portion 26 that is actuatable to selectively electrically connect the motor 42 and the battery pack 34 to provide DC power to the motor 42.

Figure 3:
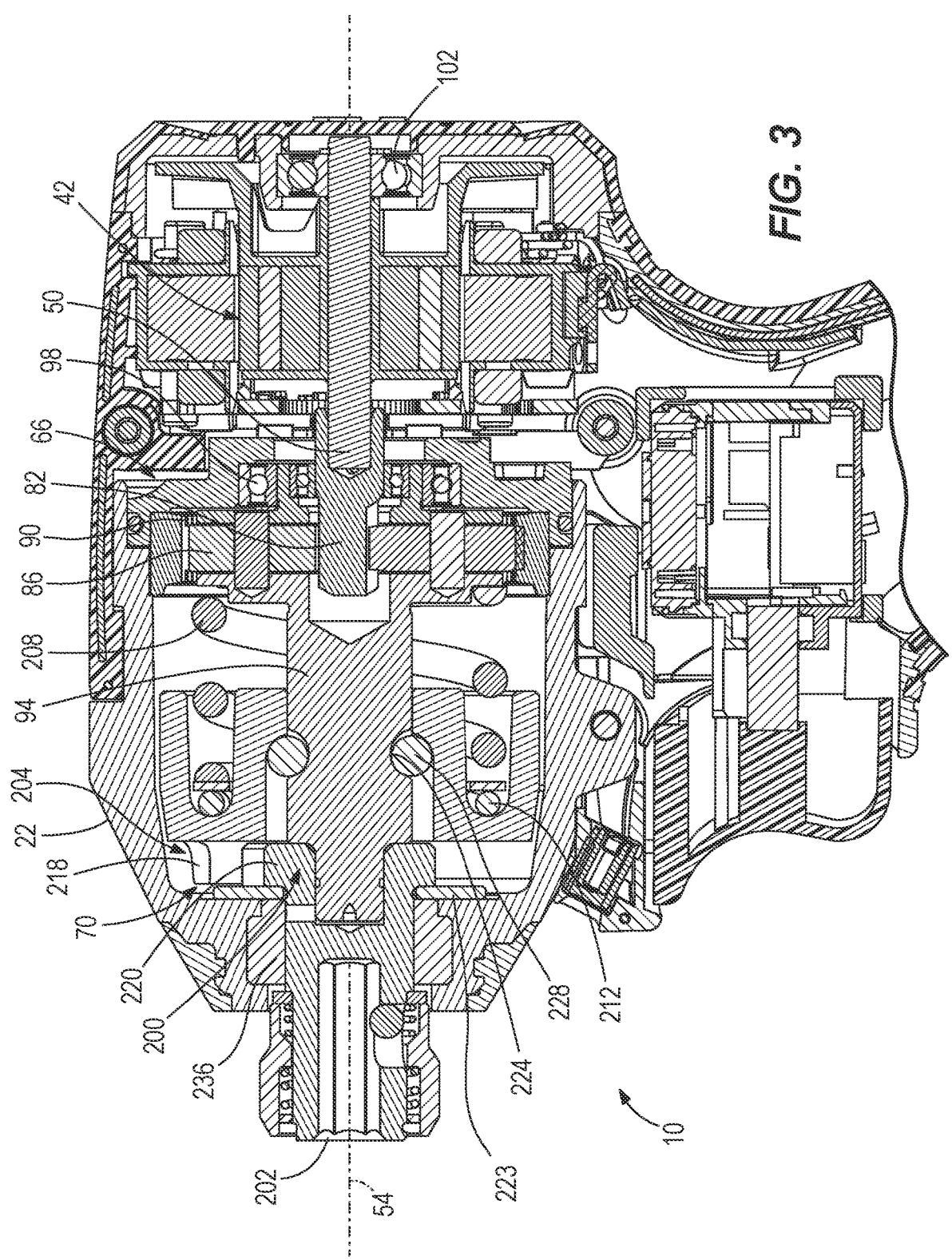
FIG. 3 is an enlarged cross-sectional view of a portion of the impact tool illustrated in FIG. 2.

With reference to FIG. 3, the impact wrench 10 further includes a gear assembly 66 coupled to the motor output shaft 50 and a drive assembly 70 coupled to an output of the gear assembly 66. The gear assembly 66 is at least partially housed within the gear case 22. The gear assembly 66 may be configured in any of a number of different ways to provide a speed reduction between the output shaft 50 and an input of the drive assembly 70.

The illustrated gear assembly 66 includes a pinion 82 formed on the motor output shaft 50, a plurality of planet gears 86 meshed with the pinion 82, and a ring gear 90 meshed with the planet gears 86 and rotationally fixed within the gear case 22. The planet gears 86 are mounted on a camshaft 94 of the drive assembly 70 such that the camshaft 94 acts as a planet carrier. Accordingly, rotation of the output shaft 50 rotates the planet gears 86, which then orbit along the inner circumference of the ring gear 90 and thereby rotate the camshaft 94. The gear assembly 66 thus provides a gear reduction ratio from the output shaft 50 to the camshaft 94. The output shaft 50 is rotatably supported by a first or forward bearing 98 and a second or rear bearing 102.

The drive assembly 70 of the impact tool 10 includes an anvil 200 extending from the gear case 22 with a bit holder 202 to which a tool element (e.g., a screwdriver bit; not shown) can be coupled for performing work on a workpiece (e.g., a fastener). The drive assembly 70 is configured to convert the continuous rotational force or torque provided by the motor 42 and gear assembly 66 to a striking rotational force or intermittent applications of torque to the anvil 200 when the reaction torque on the anvil 200 (e.g., due to engagement between the tool element and a fastener being worked upon) exceeds a certain threshold. In the illustrated embodiment of the impact wrench 10, the drive assembly 66 includes the camshaft 94, a hammer 204 supported on and axially slidable relative to the camshaft 94, and the anvil 200.

The drive assembly 70 further includes a spring 208 biasing the hammer 204 toward the front of the impact wrench 10 (i.e., toward the left in FIG. 3). In other words, the spring 208 biases the hammer 204 in an axial direction toward the anvil 200, along the axis 54. A thrust bearing 212 and a thrust washer 216 are positioned between the spring 208 and the hammer 204. The thrust bearing 212 and the thrust washer 216 allow for the spring 208 and the camshaft 94 to continue to rotate relative to the hammer 204 after each impact strike when lugs 218 on the hammer 204 engage with corresponding anvil lugs 220 and rotation of the hammer 204 momentarily stops. A washer 223 may be located between the anvil 200 and a front end of the gear case 22 in some embodiments. The camshaft 94 further includes cam grooves 224 in which corresponding cam balls 228 are received. The cam balls 228 are in driving engagement with the hammer 204 and movement of the cam balls 228 within the cam grooves 224 allows for relative axial movement of the hammer 204 along the camshaft 94 when the hammer lugs 218 and the anvil lugs 220 are engaged and the camshaft 94 continues to rotate.

With continued reference to FIG. 3, the anvil 200 is rotatably supported by a bushing 236 fixed within a front portion of the gear case 22. In the illustrated embodiment, the bushing 236 is made of powdered metal. The powdered metal construction of the bushing 236 provides the bushing 236 with greater porosity than conventional metal bushings. This greater porosity advantageously allows the bushing 236 to be impregnated with a lubricant, such as oil, which provides the bushing 236 with self-lubricating properties. Accordingly, the anvil 200 rotates with less wear and improved stability (i.e. reduced wobble).

Figure 4:
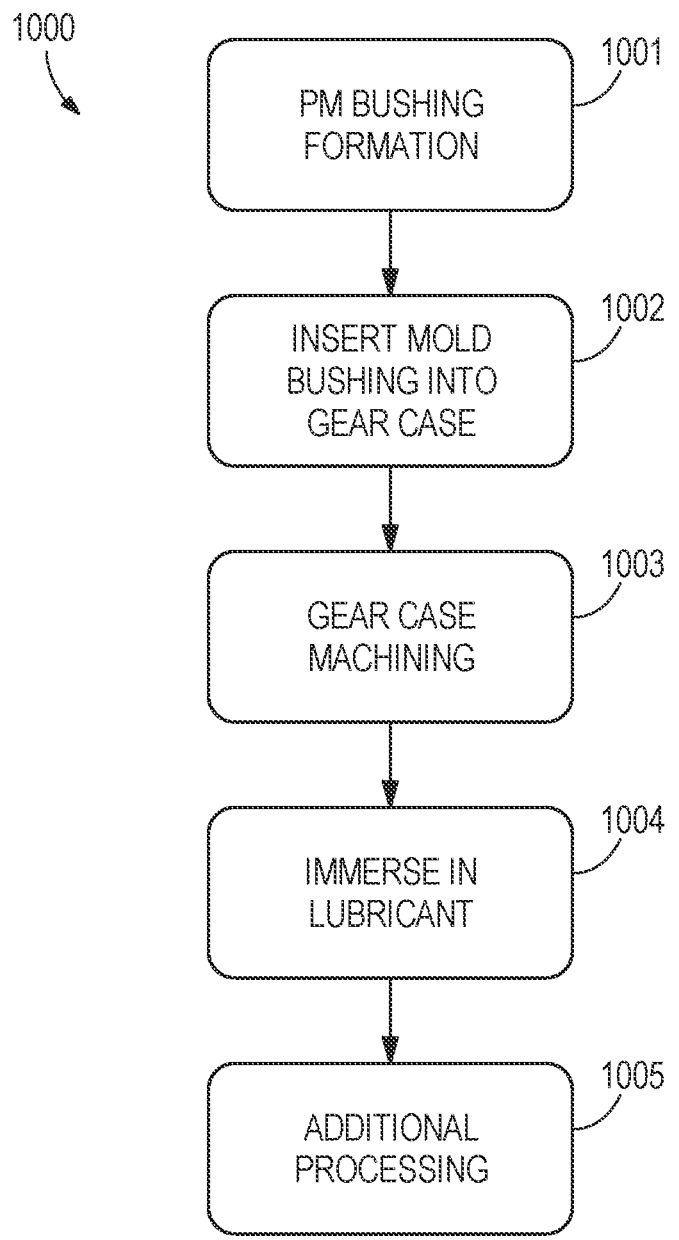
FIG. 4 is exemplary flow chart describing one embodiment of the method for preparing a powdered metal bushing and front casing for an impact tool.

FIG. 4 illustrates a method 1000 of manufacturing the bushing 236 and the gear case 22 of the impact tool 10. First, the bushing 236 is formed at step 1001 via a powdered metal compaction and sintering process. Alternatively, the bushing 236 may be formed from powdered metal using any other suitable process, such as a laser sintering additive manufacturing process. Next, at step 1002, the bushing 236 is inserted into a mold for the gear case 22. The gear case 22 is then molded around the bushing 236 (e.g., in a die casting process), which secures the bushing 236 within the gear case 22 without the need for a subsequent press-fitting operation or additional fasteners (e.g., snap rings).

Next, at step 1003, the gear case 22 may be machined using a CNC mill or a similar machine tool to achieve desired tolerances and surface finishes. The gear case 22 and the bushing 236 may also be cleaned before, during or after the machining process, using any of a variety of methods, such as ultrasonic cleaning. Ultrasonic cleaning is characterized by inducing high frequency sound waves to agitate a liquid or cutting fluid, which is turn exerts strong forces on surface contaminants or impurities. Anti-rust or other anti-corrosive additives may be added to further increase the effectiveness of the ultrasonic cleaning process.

Next, the gear case 22 (and the bushing 236 contained inside) is immersed in a liquid lubricant, such as oil, at step 1004. The lubricant is wicked into the pores of the powdered metal bushing 236 by capillary action so that the bushing 236 is impregnated with the lubricant. In some embodiments, after being immersed in the lubricant, the bushing 236 has an impregnation ratio (i.e. a ratio of the mass of absorbed lubricant to the mass of the bushing 236) between about 10% and about 20%. In some embodiments, the bushing 236 has an impregnation ratio of about 15%. The absorbed lubricant may gradually be released from the bushing 236 over time so that the bushing 236 is self-lubricating. Finally, at step 1005, the gear case 22 and/or the powdered metal bushing 236 may be cleaned, painted, or undergo any additional desired processing before further assembly of the impact tool 10 including, for example, inserting the anvil 200 into the bushing 236.

Referring to FIGS. 1-3, in operation of the impact tool 10, an operator depresses the trigger 62 to activate the motor 42, which continuously drives the gear assembly 66 and the camshaft 94 via the output shaft 50. As the camshaft 94 rotates, the cam balls 228 drive the hammer 204 to co-rotate with the camshaft 94, and the hammer lugs 218 engage, respectively, driven surfaces of the anvil lugs 220 to provide an impact and to rotatably drive the anvil 200 and the tool element. The bushing 236 rotatably supports the anvil 200 and gradually releases lubricant to maintain low-friction operation and to inhibit the anvil 200 from wobbling.

After each impact, the hammer 204 moves or slides rearward along the camshaft 94, away from the anvil 200, so that the hammer lugs disengage the anvil lugs 220. As the hammer 204 moves rearward, the cam balls 228 situated in the respective cam grooves 224 in the camshaft 94 move rearward in the cam grooves 224. The spring 208 stores some of the rearward energy of the hammer 204 to provide a return mechanism for the hammer 204. After the hammer lugs 218 disengage the respective anvil lugs 220, the hammer 204 continues to rotate and moves or slides forwardly, toward the anvil 200, as the spring 208 releases its stored energy, until the drive surfaces of the hammer lugs 218 re-engage the driven surfaces of the anvil lugs 220 to cause another impact.

Although the bushing 236 is shown incorporated in a rotary impact tool 10, the bushing 236 may alternatively be used with other rotary power tools (e.g., drills, reciprocating saws, rotary hammers, pulse drivers, etc.) for supporting an output spindle or shaft. In such tools, the bushing 236 substitutes for a roller bearing, such as a needle bearing or a ball bearing, which reduces cost of the tool without reducing the lifespan of the tool.

Various features of the invention are set forth in the following claims.

What is claimed is:

1. A method of manufacturing a tool comprising:
   providing a bushing;
   molding a housing around the bushing to secure the bushing within the housing;
   immersing the housing in lubricant such that the lubricant is wicked into the bushing to impregnate the bushing with the lubricant; and
   providing a drive assembly including an output shaft extending from the housing such that a tool element for performing work on a workpiece is attachable to the output shaft;
   wherein the bushing has an impregnation ratio between 5% and 25%.

2. The method of claim 1, wherein the lubricant is an oil.

3. The method of claim 1, wherein the bushing has an impregnation ratio between 10% and 20%.

4. The method of claim 1, wherein the output shaft is an anvil, and wherein the drive assembly further includes a camshaft and a hammer configured to impart consecutive rotational impacts upon the anvil in response to rotation of the camshaft.

5. The method of claim 4, wherein the anvil includes a lug configured to be impacted by the hammer, and wherein the tool further comprises a washer positioned between the bushing and the lug.

6. The method of claim 1, wherein the bushing is made of powdered metal and formed by a compaction and sintering process.

7. The method of claim 1, wherein the bushing is configured to gradually release the lubricant over time during ordinary operation of the tool.

8. The method of claim 1, wherein the bushing includes an inner side facing the output shaft and an outer side opposite the inner side, and wherein the outer side includes a stepped configuration.

9. A method of manufacturing a tool comprising:
   providing a bushing;
   insert-molding the bushing within a housing;
   immersing the housing in lubricant to impregnate the bushing with the lubricant providing a drive assembly including
      an anvil extending from the housing,
      a camshaft, and
      a hammer configured to impart consecutive rotational impacts upon the anvil in response to rotation of the camshaft; and
   inserting the anvil into the bushing such that the bushing rotatably supports the anvil,
   wherein the bushing is configured to gradually release the lubricant over time during ordinary operation of the tool.

10. The method of claim 9, wherein the bushing is made of powdered metal.

11. The method of claim 10, wherein the lubricant is an oil.

12. The method of claim 9, wherein the anvil includes a lug configured to be impacted by the hammer, and wherein the tool further comprises a washer positioned between the bushing and the lug.

13. A method of manufacturing a tool, the method comprising:
   forming a bushing;
   inserting the bushing into a mold cavity;
   molding a gear case of the tool in the mold cavity around the bushing; and
   immersing the gear case in lubricant such that the lubricant is wicked into the bushing to impregnate the bushing with the lubricant.

14. The method of claim 13, wherein the lubricant is an oil, and wherein the bushing absorbs the lubricant to an impregnation ratio between 10% and 20%.

15. The method of claim 13, further comprising machining the gear case prior to immersing the gear case in the lubricant.

16. The method of claim 13, further comprising inserting an anvil of the tool into the bushing such that the bushing rotatably supports the anvil in the gear case.

* * * * *